(12) United States Patent
Alster et al.

(10) Patent No.: US 7,152,705 B2
(45) Date of Patent: Dec. 26, 2006

(54) DUAL ENGINE ELECTRIC DRIVE SYSTEM

(75) Inventors: Louis Gregory Alster, Morton, IL (US); William H. Lane, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/742,897

(22) Filed: Dec. 23, 2003

(65) Prior Publication Data

US 2005/0133284 A1 Jun. 23, 2005

(51) Int. Cl.
*B60K 1/00* (2006.01)

(52) U.S. Cl. ..................................... 180/65.2; 180/65.4

(58) Field of Classification Search ............... 180/65.9, 180/65.1, 65.2, 65.6, 65.7, 65.5, 65.4; 307/64, 307/84; 74/661, 665 B; 416/125, 129; 244/121; 477/2

See application file for complete search history.

(56) References Cited

U.S. PATENT DOCUMENTS

| | | | |
|---|---|---|---|
| 1,849,755 A | 3/1932 | Fielder | |
| 1,900,470 A * | 3/1933 | Smith | 180/69.6 |
| 2,462,902 A | 3/1949 | Rockwell et al. | |
| 2,832,201 A * | 4/1958 | Alexander | 180/69.6 |
| 3,645,351 A * | 2/1972 | Muller | 180/69.6 |
| 3,723,750 A * | 3/1973 | Dixon et al. | 307/64 |
| 4,189,021 A | 2/1980 | Scheuerpflug et al. | |
| 4,270,622 A | 6/1981 | Travis | |
| 4,325,451 A | 4/1982 | Umeda | |
| 4,392,393 A * | 7/1983 | Montgomery | 74/661 |
| 4,421,217 A | 12/1983 | Vagias | |
| RE31,500 E | 1/1984 | Brownfield | |
| 4,588,040 A | 5/1986 | Albright, Jr. et al. | |
| RE33,687 E | 9/1991 | Greer | |
| 5,350,031 A | 9/1994 | Sugiyama et al. | |
| 5,492,189 A * | 2/1996 | Kriegler et al. | 180/65.2 |
| 5,669,842 A | 9/1997 | Schmidt | |
| 5,701,062 A | 12/1997 | Barrett | |
| 5,847,470 A | 12/1998 | Mitchell | |
| 5,861,569 A | 1/1999 | Abels | |
| 5,915,292 A | 6/1999 | Abels | |
| 5,954,479 A * | 9/1999 | Smith | 416/125 |
| 6,123,163 A | 9/2000 | Otsu et al. | |
| 6,177,738 B1 * | 1/2001 | Hentunen et al. | 307/64 |
| 6,179,078 B1 | 1/2001 | Belloso | |
| 6,188,139 B1 * | 2/2001 | Thaxton et al. | 290/4 R |
| 6,253,865 B1 * | 7/2001 | Suzuki | 180/65.2 |
| 6,306,056 B1 * | 10/2001 | Moore | 180/65.1 |
| 6,397,965 B1 | 6/2002 | McFarlane et al. | |
| 6,474,068 B1 | 11/2002 | Abdel Jalil et al. | |
| 6,484,970 B1 * | 11/2002 | Lin et al. | 244/121 |
| 6,722,458 B1 * | 4/2004 | Hofbauer | 180/65.4 |
| 2001/0042649 A1 | 11/2001 | Maeda et al. | |
| 2002/0148659 A1 | 10/2002 | Bordini | |
| 2003/0015356 A1 | 1/2003 | Wolfgang et al. | |
| 2003/0104899 A1 * | 6/2003 | Keller | 477/2 |

* cited by examiner

*Primary Examiner*—Hau Phan
(74) *Attorney, Agent, or Firm*—Finnegan, Henderson, Farabow, Garrett & Dunner

(57) ABSTRACT

An electric drive system includes a first engine and a second engine. A first electric generator is adapted to be driven by the first engine and to generate a first output. A second electric generator is adapted to be driven by the second engine and to generate a second output. An energy storage device is adapted to receive the first output from the first electric generator and the second output from the second electric generator. An electric motor is operatively connected to the energy storage device. The electric motor is operable to generate mechanical power.

25 Claims, 3 Drawing Sheets

DUAL ENGINE ELECTRIC DRIVE SYSTEM

TECHNICAL FIELD

The present invention is directed to an electric drive system and, more particularly, to a dual engine electric drive system.

BACKGROUND

Fuel efficiency and emission generation characteristics are important concerns in the design and operation of an internal combustion engine. An internal combustion engine may be used in a vehicle, such as, for example, an on or off highway truck, a work machine, or an automobile. In addition, an internal combustion engine may be used in a stationary system, such as, for example, a power generator.

An internal combustion engine of a vehicle may be operated to generate the power required to both propel the vehicle and to operate any auxiliary systems associated with the vehicle. The vehicle may include a transmission that connects the internal combustion engine with a ground engaging device, such as, for example, a set of wheels or tracks. In addition, the vehicle may include a "power take off" unit that is connected to the internal combustion engine and that directs power from the internal combustion engine to operate any auxiliary devices associated with the vehicle.

An internal combustion engine may be tuned to achieve optimal fuel efficiency under certain operating conditions, such as when operating at a certain engine speed and load. Typically, an engine is designed and tuned to achieve optimal fuel efficiency when the vehicle is operating in steady-state conditions such as, for example, at an expected cruising speed. When the vehicle is operated outside of these steady-state conditions, such as, for example, when the vehicle is accelerating, decelerating, or idling, the vehicle may experience increased losses that result in a reduction in the fuel efficiency of the engine.

A vehicle may use an alternative power source to compensate for these types of efficiency losses. As shown in U.S. Pat. No. 5,350,031 to Sugiyama, a vehicle may include an electric drive that is disposed between the engine and the ground engaging devices. The electric drive may include a generator, an electric motor, and a storage device, such as a battery. Operation of the engine may drive the generator, which provides power to the electric motor to thereby drive the ground engaging devices. Excess power that is generated, but is not used to drive ground engaging devices or power any auxiliary systems, may be directed to the storage device.

The internal combustion engine and generator may generate excess power under several different operating conditions, such as, for example, when the vehicle is decelerating or idling. During these circumstances, the excess power may be saved in the storage device for later use. The stored power may be used, for example, when the vehicle requires an increased amount of power, such as when the vehicle is accelerating. In this manner, the energy storing capabilities of the electric drive may be used to reduce the magnitude of the loses associated with both vehicle deceleration and acceleration.

However, in this type of electric drive system, the internal combustion engine may be operated outside of its optimal operating conditions. For example, when the vehicle is accelerating, the engine speed and load be increased above the optimal operating conditions of the engine. In addition, when the vehicle is idling, the engine speed and load may be below the optimal operating conditions of the engine. Accordingly, an internal combustion engine used with this type of electric drive system may still experience the reduction in fuel efficiency associated with operating the engine outside of the optimal operating conditions.

The disclosed electric drive system solves one or more of the problems set forth above.

SUMMARY OF THE INVENTION

In one aspect, the present invention is directed to an electric drive system that includes a first engine and a second engine. A first electric generator is adapted to be driven by the first engine and to generate a first output. A second electric generator is adapted to be driven by the second engine and to generate a second output. An energy storage device is adapted to receive the first output from the first electric generator and the second output from the second electric generator. An electric motor is operatively connected to the energy storage device. The electric motor is operable to generate mechanical power.

In another aspect, the present invention is directed to a method of operating an electric drive system. A voltage is applied from an electrical storage device to an electric motor. A first engine is operated to drive a first generator to supply electrical power to the electrical storage device under a first set of operating conditions. A second engine is operated to drive a second generator to supply electrical power to the electrical storage device under a second set of operating conditions.

DETAILED DESCRIPTION

Figure 1:
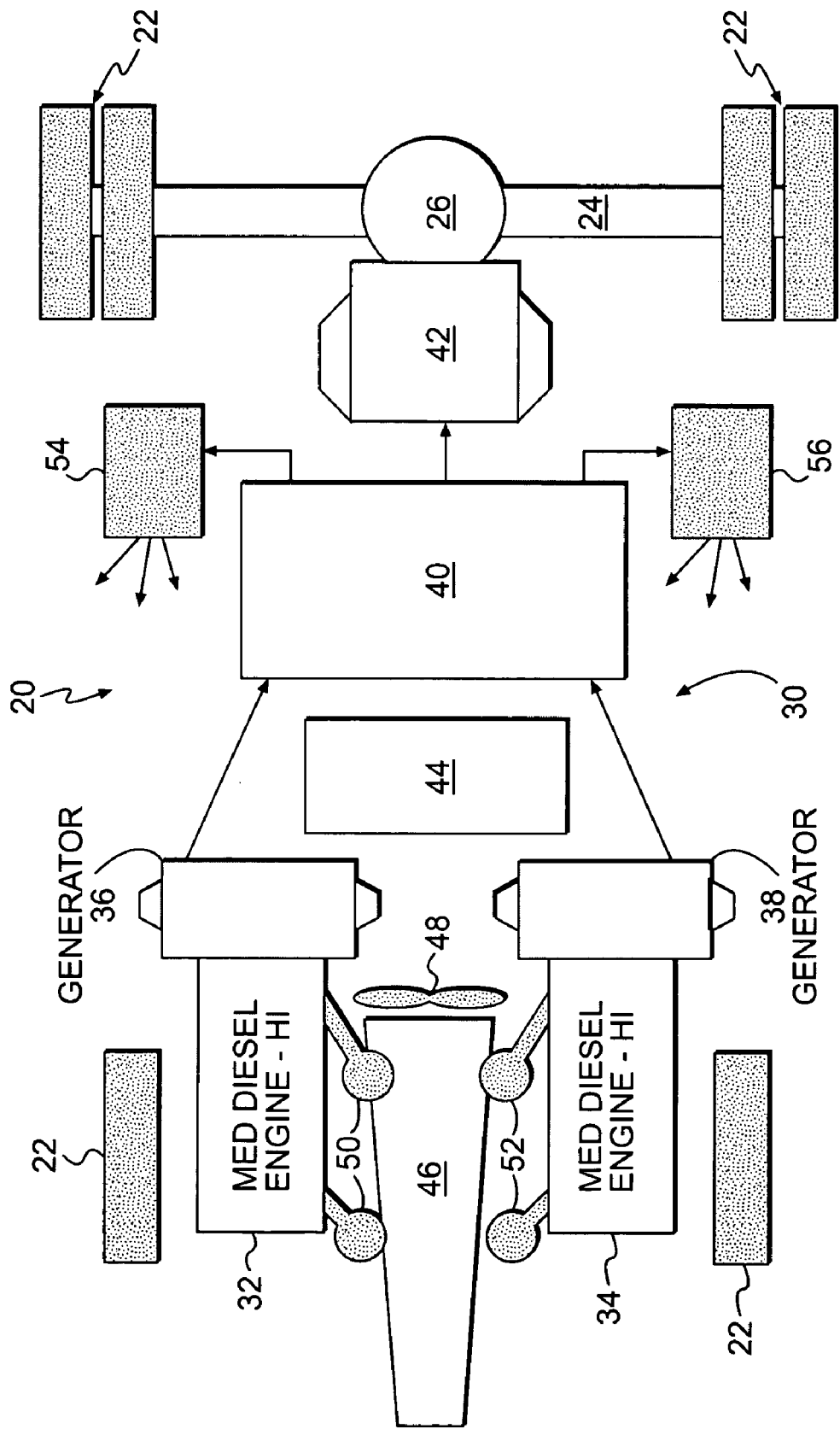
FIG. 1 is a schematic and diagrammatic representation of a vehicle having an electric drive system in accordance with an exemplary embodiment of the present invention.

FIG. 1 illustrates an exemplary embodiment of a vehicle 20 that includes an electric drive 30. Vehicle 20 may be, for example, an on or off highway truck, a work machine, an automobile, or another such vehicle. It should be noted, however, that the concepts disclosed herein may be applied to a stationary drive system, such as, for example, an electrical power generator.

Vehicle 20 may include a series of ground engaging devices 22. For the purposes of the present disclosure, vehicle 20 will be described as an on highway truck where ground engaging devices 22 are wheels. One skilled in the art will recognize that ground engaging devices 22 may be any type of ground engaging device commonly used on another type of vehicle 20, such as, for example, tracks or belts.

Vehicle 20 may include a first engine 32 and a second engine 34. First and second engines 32 and 34 may be internal combustion engines, such as, for example, diesel engines. Alternatively, first and second engines 32 and 34 may be gasoline engines, natural gas engines, or any other type of internal combustion engine readily apparent to one skilled in the art.

First and second engines 32 and 34 may be equipped with standard supplemental systems, such as, for example, a cam-driven fuel injection system and a cam driven valve actuation system. First and second engines 32 and 34 may also include additional performance enhancing systems, such as, for example, hydro-electric variable valve actuation system, hydro-electric fuel injection systems, engine gas recirculation systems, turbochargers, superchargers, or any other performance enhancing system readily apparent to one skilled in the art.

Figure 2:
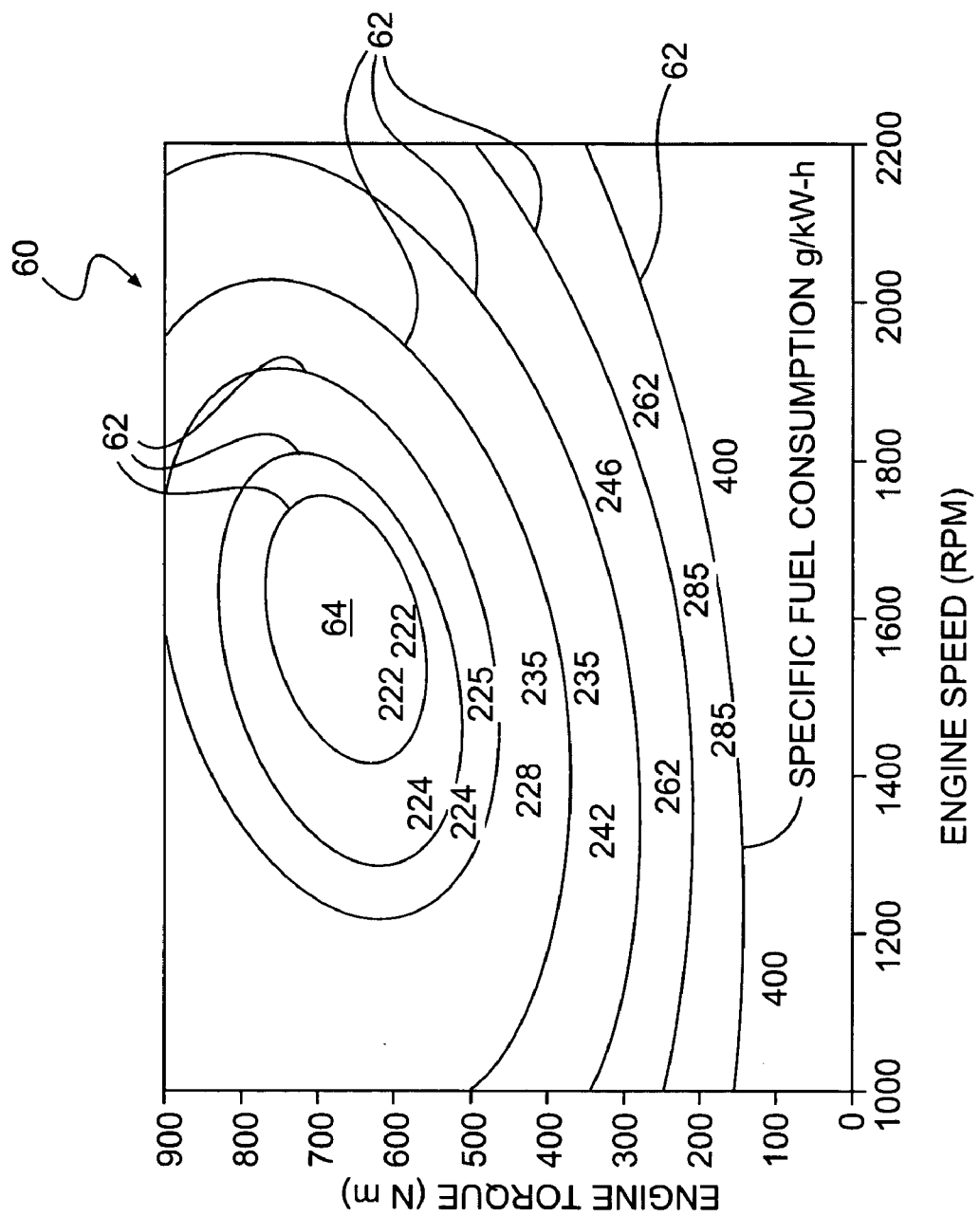
FIG. 2 is a graph illustrating an exemplary relationship between specific fuel consumption, engine torque, and engine speed.

As one skilled in the art will recognize, the specific fuel consumption of an internal combustion engine, such as engines 32 and 34, may vary as a function of engine torque and engine speed. FIG. 2 illustrates a graph 60 that plots an exemplary relationship between the specific fuel consumption of an engine as a function of engine load (torque) and engine speed. A series of lines 62 indicate the particular specific fuel consumption for various engine speeds and torques.

An internal combustion engine may have preferred operating characteristics, for example where the specific fuel consumption is the lowest, over a certain range of engine speeds and engine torque. For the exemplary graph 60 of FIG. 2, an area 64 represents a preferred range of engine speeds and engine torques where the operating characteristics of the engine are optimized. Area 64 represents the engine speeds and loads at which the specific fuel consumption for an exemplary engine is minimized. When the engine is operated in the engine speed and load ranges indicated by area 64 of peak performance, the fuel efficiency of the engine is, therefore, optimized. When the engine load or speed is changed so that the engine is operating outside of area 64 of peak performance, the specific fuel consumption of the engine will increase and the fuel efficiency of the engine will decrease.

One skilled in the art will recognize that the range of engine speeds and loads corresponding to area 64 of peak performance and where the engine exhibits the preferred operating characteristics may be adjusted by "tuning" the operation of the engine. For example, the valve actuation system may be adjusted to change the timing of the intake and/or exhaust valve actuation. In addition, the fuel injection system may be adjusted to vary the timing at which fuel is injected into each combustion chamber. Other such adjustments, such as adding or adjusting the operation of a turbocharger or supercharger may also impact the engine speeds and torques at which the engine experiences the lowest specific fuel consumption.

With reference to FIG. 1, first and second engines 32 and 34 of vehicle 20 may be manufactured to be substantially equivalent. For example, first and second engines 32 and 34 may have a substantially similar torque output capacity, such as when the basic components of first and second engines 32 and 34 are made according to the same design specifications. This substantial equivalency may be accomplished, for example, where each of first and second engines 32 and 34 have substantially similar engine block and cylinder sizes. In addition, each of first and second engines 32 and 34 may have substantially similar piston and cylinder sizes such that each engine has a substantially similar volumetric displacement.

Each of first and second engines 32 and 34 may be tuned so that the area of peak performance 64, where the engine exhibits preferred operating characteristics, corresponds to different engine torque and/or engine speed. In one embodiment, first engine 32 is tuned such that area 64 of peak performance corresponds to greater engine torques and/or speeds than the area 64 of peak performance for second engine 34. Any of the various tuning approaches discussed previously may be used to vary the relative location of area 64 of peak performance between first and second engines 32 and 34.

As shown in FIG. 1, electric drive system 30 may include a first generator 36 and a second generator 38. Each of first and second generators 36 and 38 may be operated to generate an electrical output. First generator 36 may be connected to first engine 32 such that operation of first engine 32 causes first generator 36 to generate a first electrical output. Second generator 38 may be connected to second engine 34 such that operation of second engine 34 causes second generator 38 to generate a second electrical output.

As one skilled in the art will recognize, first and second generators 36 and 38 may also be "tuned" for peak performance in response to a certain input torque and speed. This may allow each generator to generate electrical power with a minimal amount of losses. For example, first generator 36 may be tuned to generate a first voltage magnitude in response to a relatively high input torque and speed and second generator 38 may be tuned to generate a second voltage magnitude in response to a relatively low input torque and speed.

First and second generators 36 and 38 may be tuned to achieve preferred operating characteristics with first and second engines 32 and 34. In one embodiment, first generator 36 may be matched with first engine 32 such that the peak performance of first generator 36 coincides with the engine speeds and torques of area 64 of peak performance of first engine 32. Similarly, second generator 38 may be matched with second engine 34 such that the peak performance of second generator 38 coincides with the engine speeds and torques of area 64 of peak performance of second engine 34. In this manner, first and second generators 36 and 38 may be matched with first and second engines 32 and 34 to reduce the losses associated with converting the mechanical power generated by each engine into electrical power.

First engine 32 and first generator 36 may be tuned to generate a first magnitude of electrical power sufficient to meet a first set of vehicle operating conditions. Second engine 34 and second generator 38 may be tuned to generate a second magnitude of electrical power sufficient to meet a second set of vehicle operating conditions. For example, the first magnitude of electrical power may be sufficient to power vehicle 20 when vehicle 20 is operating under a steady-state, or "cruising," condition. The second magnitude of electrical power may be sufficient to power the auxiliary systems of vehicle 20 when vehicle 20 is idling.

Electric drive system 30 may also include a storage device 40. Storage device 40 may include one or more batteries, capacitors, or other type of device adapted to store electrical energy. Storage device 40 may be connected to both first and second generators 36 and 38 to receive and store the electrical energy generated by the operation of first engine 32 and first generator 36 and/or second engine 34 and second generator 38.

Electric drive system 30 may also include an electric motor 42 connected to storage device 40. Electric motor 42 may be any type of electric motor, such as, for example an induction motor or an alternating current motor. Storage device 40 may apply a voltage to electric motor 42 to induce a rotation of a rotor associated with electric motor 42. The magnitude of the voltage applied to electric motor 42 may be varied to thereby vary the rotational rate of the rotor.

Electric motor 42 may be connected to the rear ground engaging device 22. However, one skilled in the art will recognize that electric motor 42 may be connected to the front ground engaging devices. In addition, electric dive system 30 may include a second electric motor (not shown) that is engaged with the other of the first and second ground engaging devices 22.

Electric motor 42 may be connected to ground engaging devices 22 through a differential 26 and an axle 24. In response to the application of a voltage from storage device 40, electric motor 42 may operate to rotate a shaft connected with differential 26. Differential 26 translates the rotation of the shaft into a corresponding rotation of axle 24 to thereby drive ground engaging devices 22 and propel vehicle 20.

Vehicle 20 may also include a heat exchanger 46. Heat exchanger 46 may be any type of heat exchanger commonly used in a vehicle. A fan 48 may be connected to one or both of first and second engines 32 or 34 to drive the fan 48. This may move air through heat exchanger 46 to thereby cool operating fluids associated with first and second engines 32 and 34.

Heat exchanger 46 may be adapted to service both first and second engines 32 and 34. A first set of auxiliary devices 50, such as pumps and/or filters, may be disposed between heat exchanger 46 and first engine 32. A second set of auxiliary devices 52, such as pumps and/or filters, may be disposed between heat exchanger 46 and second engine 34.

A first power unit 54 and a second power unit 56 may be operatively engaged with storage device 40. First power unit 54 may be adapted to supply power to auxiliary systems and devices that require large amounts of electrical power, such as, for example, air conditioning systems, hydraulic systems, lighting systems, etc. Second power unit 56 may be adapted to supply power to auxiliary systems and devices that require small amounts of electrical power, such as, for example, first and second sets of auxiliary devices 50 and 52.

Vehicle 20 may also include a controller 44. Controller 44 may include a microprocessor and a memory. As is known to those skilled in the art, the memory may be connected to the microprocessor and may store an instruction set and variables. Associated with the microprocessor and part of controller 44 are various other known circuits (not shown) such as, for example, power supply circuitry, signal conditioning circuitry, and solenoid driver circuitry, among others.

Controller 44 may be programmed to control various aspects of the operation of vehicle 20. For example, controller 44 may be programmed to control the operation of first engine 32, the operation of second engine 34, and the magnitude of voltage applied by storage device 40 to electric motor 42. The operation of first and second engines 32 and 34 may be controlled, for example, by selectively starting and stopping each of first and second engines 32 and 34 and by adjusting the amount of fuel supplied to each of first and second engines 32 and 34. One skilled in the art will recognize that controller 44 may govern other aspects of the operation of vehicle and may control other facets of the operation of each of first and second engine 32 and 34.

Controller 44 may also be adapted to receive information regarding the operation of vehicle 20 from one or more sensors. To this end, a series of sensors (not shown) may be operatively engaged with various parts of vehicle 20. For example, the series of sensors may be adapted to provide information related to the requested acceleration or deceleration from an operator, the charge level of storage device, the speed of vehicle 20, and/or the operating parameters of first and second engines 32 and 34. One skilled in the art will recognize that sensors may be adapted to provide information related to other aspects of the operation of vehicle 20.

Controller 44 may control operation of first and second engines 32 and 34 to generate an appropriate amount of electrical power to meet the current operating needs of vehicle 20. For the purposes of describing the operation of electric drive system 30 under different operational demands, an exemplary vehicle operational sequence is illustrated in a graph 70 of FIG. 3. Graph 70 illustrates an exemplary engine capacity, or engine speed and load, at which each of first and second engines 32 and 34 are operated in response to the different operational demands of vehicle 20. Line 72 of graph 70 indicates the operating capacity, i.e. engine speed and load, of first engine 32 and line 74 of graph 70 indicates the operating capacity, i.e. engine speed and load, of second engine 34.

Figure 3:
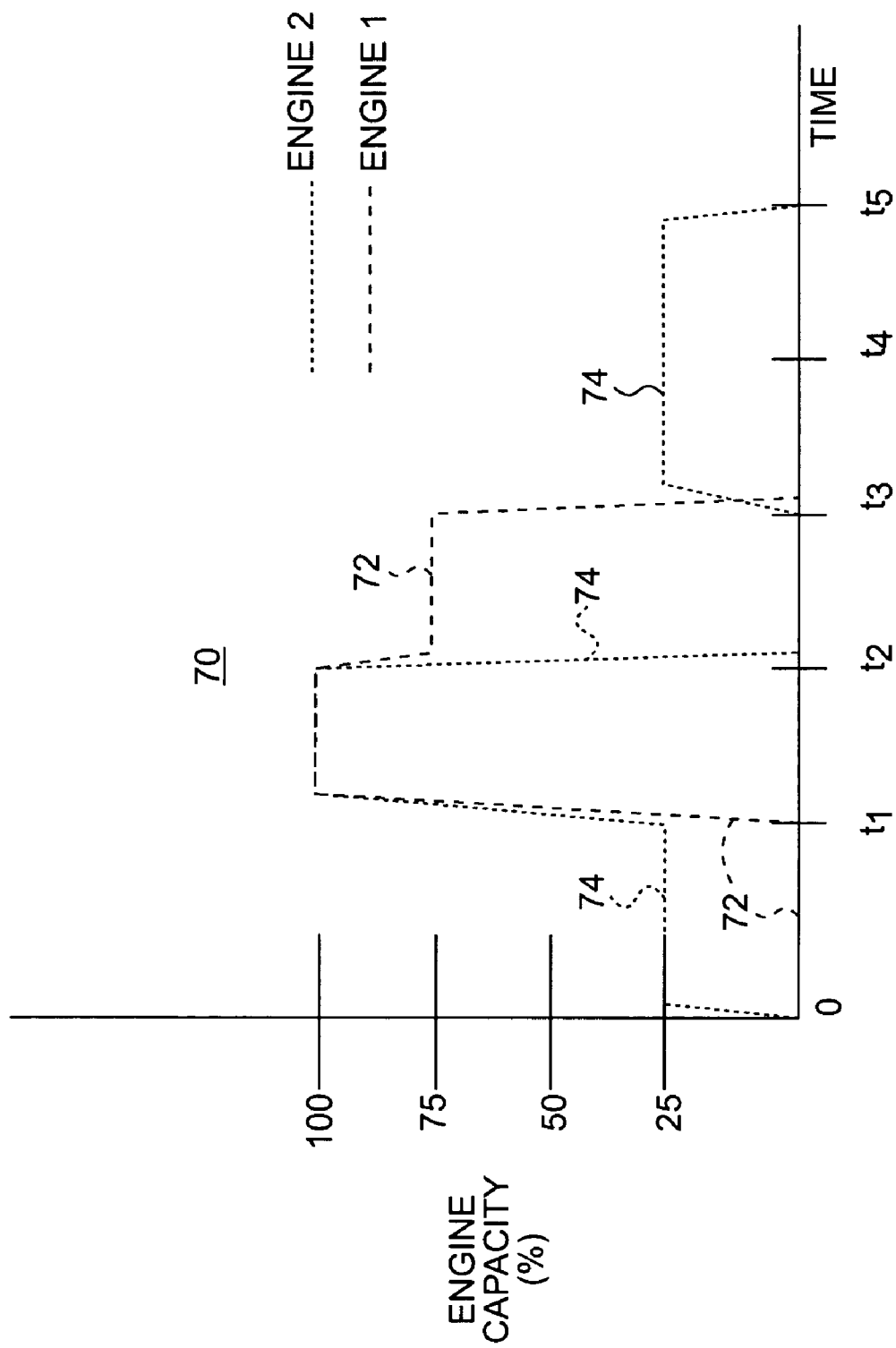
FIG. 3 is a graph illustrating an exemplary vehicle operational sequence for an electric drive in accordance with the present invention.

In the exemplary operational sequence of FIG. 3, the operator starts the vehicle at time $t_0$ and allows the vehicle to idle until time $t_1$. At time $t_1$, the operator accelerates vehicle 20 to a cruising speed. The cruising speed is achieved at $t_2$, and maintained until time $t_3$. At time $t_3$, the operator decelerates the vehicle to a stop, which is achieved at time $t_4$. The operator then allows the vehicle to idle until time $t_5$, when the vehicle is shut down.

In this exemplary embodiment, first engine 32 is tuned such that area 64 of peak performance coincides with an engine capacity of approximately 75%. Second engine 34 is tuned such that area 64 of peak performance coincides with an engine capacity of approximately 25%. As described in greater detail below, controller 44 selectively operates first and second engines 32 and 34 to meet the power requirements of vehicle 20 while maintaining optimum fuel efficiency.

When the operator instructs controller 44 to start vehicle 20 at time to, controller 44 starts second engine 34 and controls the associated fuel injection system to operate second engine 34 at approximately 25% capacity. Controller 44 does not start first engine 32. Second engine 34 drives second generator 38 to generate the power required to operate any necessary auxiliary or supplemental systems on vehicle 20. Thus, second engine 34 is operated in its area 64 of peak efficiency. Any excess power may be stored in storage device 40. In this manner, the specific fuel consumption of vehicle 20 is minimized when vehicle 20 is idling.

At time $t_1$, the operator may request an acceleration of vehicle 20. In response, controller 44 may start first engine 32 and increase the amount of fuel supplied to first and second engines 32 and 34. The operation of first and second engines 32 and 34 generates the power required to drive electric motor 42 and accelerate vehicle 20. Any excess electrical power may be stored in storage device 40.

The operating capacity of first and second engines 32 and 34 may depend upon the specific acceleration demands of the operator and the energy storage levels of energy storage device 40. For example, if the operator demands full acceleration, the engine capacity of each of first and second engines 32 and 34 may be increased to 100% (as shown in FIG. 3). If, however, the operator demands a reduced acceleration or storage device 40 has a suitable reserve of electrical energy, the capacity of one or both engines 32 and 34 may be reduced so that at least one of first and second engines 32 and 34 are operated in the area 64 of peak efficiency. For example, controller 44 may operate first engine at 75% capacity and operate second engine at 25% capacity. In this manner, the fuel efficiency of first and second engines 32 and 34 may be maximized during acceleration.

At time $t_2$, the operator may stop the acceleration of vehicle 20 and allow the vehicle to maintain a cruising speed. In response, controller 44 may adjust the operation of first and second engines 32 and 34 to meet the power requirements of vehicle 20. For example, as shown in FIG. 3, controller 44 may shut down second engine 34 and adjust the operating capacity of first engine 32 to be 75%. This operational capacity of first engine 32 may generate enough power to meet the operational needs of vehicle 20.

Controller 44 may, however, monitor the energy storage reserves of storage device 40. A decrease in the energy storage reserve levels of storage device 40 may indicate that the operation of first engine 32 at 75% capacity is insufficient to meet the power requirements of vehicle 20. If the energy storage reserves in storage device 40 fall below a certain level, controller 44 may start and operate second engine 34 at 25% capacity to meet the additional power requirements. Any excess power generated by second engine 34 may be stored in storage device 40. Second engine 34 may be operated until the energy reserves in storage device 40 increase to a certain level. In this manner, controller 44 may ensure that adequate power is generated to meet the operational needs of vehicle 20.

At time $t_3$, the operator may instruct vehicle 20 to decelerate. Controller 44 may again adjust the operation of first and second engines 32 and 34 to meet the power requirements of vehicle 20. Controller 44 may decrease the capacity of first engine 32 to zero and shut down first engine 32. Controller 44 may also adjust second engine 34 to operate at approximately 25% capacity. As the power requirements of vehicle 20 will be decreased when vehicle 20 is decelerating, second engine 34 operating at 25% capacity may provide enough power to meet the requirements of vehicle 20. Any additional power generated by second engine 34 in excess of the power requirements may be stored in storage device 40. If the operational needs of vehicle 20 are in excess of the output of second engine 34, controller 44 may direct additional energy from storage device 40. If necessary, controller 44 may also increase the operating capacity of second engine 34 or start first engine 32 to generate additional power to meet the additional power requirements of vehicle 20.

At time $t_4$, vehicle 20 may come to a stop and return to idle conditions. Controller 44 may continue to operate second engine 34 at 25% capacity to meet the power requirements of any auxiliary systems that may be operating on vehicle 20. Any additional power generated by second engine 34 may be stored in storage device 40.

At time $t_5$, the operator may shut down vehicle 20. Controller 44 may then shut down first and second engines 32 and 34. Storage device 40 may contain a sufficient reserve of energy to ensure that first and second engines 32 and 34 may be started when so desired.

Industrial Applicability

The above described electric drive system may be incorporated into any type of vehicle to improve the overall efficiency of the vehicle. The electric drive system includes two, substantially similar internal combustion engines. Each of the two engines are tuned to operate with minimal specific fuel consumption at different operating capacities, or different engine speeds and loads. A controller may separately control the operating capacity of each engine to meet the current power requirements. Any excess power generated by the two engines may be stored in a storage device for later use. As each engine may be operated in a peak area of performance and excess power may be conserved, the specific fuel consumption of the vehicle may be decreased to thereby improve the overall efficiency of the vehicle.

It will be apparent to those skilled in the art that various modifications and variations can be made in the described electric drive system without departing from the scope of the disclosure. Other embodiments of the system will be apparent to those skilled in the art from consideration of the specification and practice of the system disclosed herein. It is intended that the specification and examples be considered as exemplary only, with a true scope being indicated by the following claims and their equivalents.

What is claimed is:

1. An electric drive system, comprising:
    a first engine tuned to have a minimum specific fuel consumption value within a first range of rotations per minute;
    a second engine tuned to have a minimum specific fuel consumption value within a second range of rotations per minute, wherein the second range of rotations per minute is different than the first range;
    a controller configured to operate the first engine within the first range of rotations per minute and the second engine within the second range of rotations per minute;
    a first electric generator adapted to be driven by the first engine and to generate a first output;
    a second electric generator adapted to be driven by the second engine and to generate a second output;
    an energy storage device adapted to receive the first output from the first electric generator and the second output from the second electric generator; and
    an electric motor operatively connected to the energy storage device, the electric meter operable to generate mechanical power.

2. The system of claim 1, wherein the energy storage device is a battery.

3. The system of claim 1, wherein each of the first and second engines have a substantially similar torque output capacity.

4. The system of claim 1, wherein the first engine has preferred operational characteristics within a first torque range and the second engine has preferred operational characteristics within a second torque range, and wherein the first torque range is greater than the second torque range.

5. The system of claim 1, wherein the first output of the first generator is greater than the second output of the second generator.

6. The system of claim 1, further including a heat exchanger operatively connected with the first engine and the second engine.

7. The system of claim 1, further including a transmission axle adapted to be driven by the electric motor.

8. The system of claim 1, wherein the controller adjusts the operation of the first engine and the second engine based on current operating conditions.

9. The electric drive system of claim 1, wherein the second engine has a specific fuel consumption within the second range of rotations per minute that is lower than a specific fuel consumption of the first engine when the first engine operates outside of the first range of rotations per minute.

10. A method of operating an electric drive system, comprising:
    applying a voltage from an electrical storage device to an electric motor;

operating a first engine within a first range of rotations per minute, within which the first engine has been tuned to have a minimum specific fuel consumption value, to drive a first generator to supply electrical power to the electrical storage device under a first set of operating conditions;

determining whether the first engine is operating outside of a predetermined set of operating parameters associated with the first range of rotations per minute; and if the first engine is operating outside of the predetermined set of parameters, operating a second engine within a second range of rotations per minute, within which the second engine has been tuned to have a minimum specific fuel consumption value, wherein the first range of rotations per minute is different than the second range of rotations per minute, to drive a second generator to supply electrical power to the electrical storage device under a second set of operating conditions.

11. The method of claim 10, further including operating the first engine and the second engine to drive both the first generator and the second generator to supply power to the electrical storage device under a third set of operating conditions.

12. The method of claim 10, wherein the application of the voltage to the electric motor causes a rotation of an axle and a ground engaging device.

13. The method of claim 10, wherein the first engine and first generator are adapted to generate a first magnitude of electrical power and the second engine and second generator are adapted to generate a second magnitude of electrical power, the first magnitude being greater than the second magnitude.

14. The method of claim 10, wherein the second engine has a specific fuel consumption within the second range of rotations per minute that is lower than a specific fuel consumption of the first engine when the first engine operates outside of the first range of rotations per minute.

15. A method of assembling a drive system, comprising:
providing a first engine and a second engine, the first and second engines having substantially similar torque output capacities;
tuning the first engine to have a minimum specific fuel consumption value within a first range of engine speeds and engine torques;
connecting a first electrical generator to the first engine, the first electrical generator having preferred operational characteristics within the first range of engine speeds and engine torques;
tuning the second engine to have a minimum specific fuel consumption value within a second range of engine speeds and engine torques, wherein the first range is different than the second range;
connecting a second electrical generator to the second engine, the second electrical generator having preferred operational characteristics within the second range of engine speeds and engine torques;
operatively connecting a controller to the first engine and the second engine, the controller being configured to operate the first engine within the first range of engine speeds and engine torques and the second engine within the second range of engine speeds and engine torques;
connecting an electrical storage device to the first electrical generator and the second electrical generator; and
connecting the electrical storage device to an electric motor.

16. The method of claim 15, further including connecting the electric motor to a ground engaging device through a differential.

17. The method of claim 15, further including providing a controller adapted to control the operation of the first and second engines based on current operating conditions.

18. A vehicle comprising:
a ground engaging device;
a first internal combustion engine tuned to have a minimum specific fuel consumption value within a first range of rotations per minute;
a second internal combustion engine tuned to have a minimum specific fuel consumption value within a second range of rotations per minute, wherein the second range of rotations per minute is different than the first range;
a controller configured to operate the first internal combustion engine within the first range of rotations per minute and the second internal combustion engine within the second range of rotations per minute;
a first electric generator adapted to be driven by the first engine and to generate a first output;
a second electric generator adapted to be driven by the second engine and to generate a second output;
an energy storage device adapted to receive the first output from the first electric generator and the second output from the second electric generator;
an electric motor operatively connected to the energy storage device, the electric motor operatively connected to the ground engaging device.

19. The vehicle of claim 18, wherein each of the first and second internal combustion engines have a substantially similar torque output capacity.

20. The vehicle of claim 18, wherein the first internal combustion engine has preferred operational characteristics within a first torque range and the second internal combustion engine has preferred operational characteristics within a second torque range, and wherein the first torque range is greater than the second torque range.

21. The vehicle of claim 18, wherein the first output of the first generator is greater than the second output of the second generator.

22. The vehicle of claim 18, further including a heat exchanger operatively connected with the first internal combustion engine and the second internal combustion engine.

23. The vehicle of claim 18, further including a transmission axle disposed between the electric motor and the ground engaging device.

24. The vehicle of claim 18, wherein the controller adjusts the operation of the first internal combustion engine and the second internal combustion engine based on current operating conditions.

25. The vehicle of claim 18, wherein the second internal combustion engine has a specific fuel consumption within the second range of rotations per minute that is lower than a specific fuel consumption of the first internal combustion engine when the first internal combustion engine operates outside of the first range of rotations per minute.

* * * * *

UNITED STATES PATENT AND TRADEMARK OFFICE
CERTIFICATE OF CORRECTION

| | | |
|---|---|---|
| PATENT NO. | : 7,152,705 B2 | Page 1 of 1 |
| APPLICATION NO. | : 10/742897 | |
| DATED | : December 26, 2006 | |
| INVENTOR(S) | : Alster et al. | |

It is certified that error appears in the above-identified patent and that said Letters Patent is hereby corrected as shown below:

In the claims:

1. In Column 8, Line 35, in Claim 1, delete "meter" and insert --motor--.

Signed and Sealed this

Twentieth Day of May, 2008

JON W. DUDAS
*Director of the United States Patent and Trademark Office*